United States Patent Office 3,491,103
Patented Jan. 20, 1970

3,491,103
CERTAIN 4H-BENZO[4,5]CYCLOHEPTA-[1,2-b] THIOPHENES
Ernst Jucker, Ettingen, Anton Ebnother, Reinach, Basel, Jean-Michel Bastian, Birsfelden, Erwin Rissi, Basel, and Andre Stoll, Birsfelden, Switzerland, assignors to Sandoz Ltd. (also known as Sandoz A.G.), Basel, Switzerland
No Drawing. Continuation-in-part of applications Ser. No. 589,532, and Ser. No. 589,539, Oct. 26, 1966, which are in turn continuations-in-part of application Ser. No. 418,538, Dec. 15, 1964. This application June 15, 1967, Ser. No. 646,194
Claims priority, application Switzerland, Dec. 19, 1963, 15,641/63; Dec. 20, 1963, 15,710/63; Nov. 3, 1965, 15,191/65, 15,192/65
The portion of the term of the patent subsequent to Sept. 13, 1983, has been disclaimed
Int. Cl. C07d 99/06, 63/18; A61k 27/00
U.S. Cl. 260—293.4
9 Claims

ABSTRACT OF THE DISCLOSURE

The present invention provides 4H-benzol[4,5]cyclohepta-[1,2-b]thiophene derivatives of Formula I:

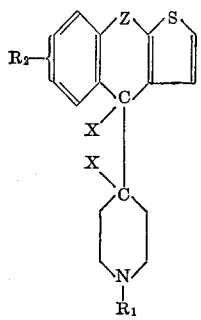

wherein:

$R_1$ is hydrogen or alkyl of 1 to 4 carbon atoms;
$R_2$ is hydrogen, chlorine, or bromine;
Z is —$CH_2$—$CH_2$— or —CH=CH—;

each X is hydrogen or together they are a second bond, and their acid addition salts; with the proviso that: when each X is hydrogen, Z is —$CH_2$—$CH_2$—; and when $R_2$ is chlorine or bromine, $R_1$ is alkyl of 1 to 4 carbon atoms. These compounds are useful as pharmaceuticals since they exhibit histaminolytic, serotonin, antagonistic and anticholinergic effects in tests effected in vitro and in vivo.

Cross reference to related applications

This application is a continuation-in-part of applications Ser. No. 589,532 and 589,539, both filed Oct. 26, 1966 which are in turn continuations-in-part of application Ser. No. 418,538, filed Dec. 15, 1964. All of these parent applications are now abandoned.

Detailed description of the invention

The present invention further provides processes for the production of compounds I and their acid addition salts.

(a) Compounds of Formula Ia:

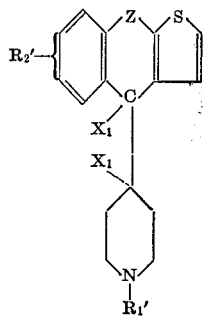

wherein $R_1'$ is a lower alkyl of 1 to 4 carbon atoms,
Z has the above significance,
$R_2'$ is chlorine or bromine when Z is —$CH_2$—$CH_2$—, but $R_2'$ is hydrogen, chlorine or bromine when Z is

—CH=CH— and the $X_1$'s are together a second bond, and their acid addition salts may be produced by treating a compound of Formula IV:

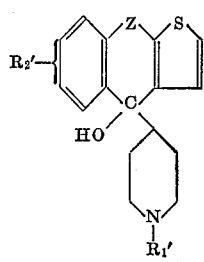

wherein $R_1'$, $R_2'$ and Z have the above significance, with an agent for splitting off the elements of water and the resulting compound Ia is optionally converted into one of its acid addition salts by reaction with an organic or inorganic acid. The compounds of Formula IV may be produced by hydrolizing the reaction product of a 4H-benzo[4,5]cyclohepta[1,2-b]thiophen-4-one of Formula II:

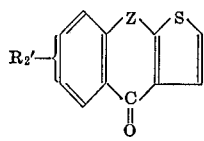

in which $R_2'$ and Z have the above significance, and an organic magnesium halogen compound of Formula III:

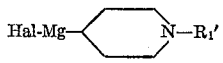

wherein $R_1'$ has the above significance, and
Hal is chlorine, bromine or iodine.

The compounds of Formula IV and their acid addition salts are part of the present invention.

One method of producing the compounds of Formula Ia is as follows:

A solution of a 4H-benzo[4,5]cyclohepta[1,2-b]thiophen-4-one derivative of Formula II in an anhydrous organic solvent therefor, preferably diethyl ether or tetrahydrofuran, is added dropwise to an organic magnesium halogen compound of Formula III dissolved in more of the same solvent and the mixture is advantageously stirred for 30 to 120 minutes or heated. The resulting reaction product is subsequently hydrolyzed in the cold with aqueous ammonium chloride solution and extracted with a water immiscible organic solvent, preferably methylene chloride, diethyl ether or benzene. The resulting 4H-benzo[4,5]cyclohepta[1,2-b]thiophen-4-ol derivative of Formula IV may be purified by crystallization and, if desired, converted into an acid addition salt with an organic or inorganic acid or worked up further as such. The desired end product of Formula Ia may then be obtained from the resulting purified material by the action of a suitable water removing agent, e.g. a mineral acid, a strong organic acid, acetic anhydride, thionyl chloride or phosphorus oxychloride.

(b) Compounds of formula Ib:

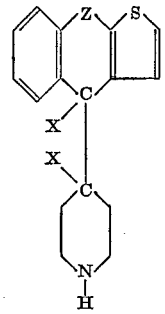

Ib wherein Z and X have the above significance, and their acid addition salts, may be produced by reacting a compound of Formula IIa:

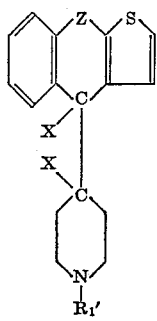

IIa wherein Z, X and $R_1'$ have the above significance, with a chloroformic acid ester of general Formula IIIa:

 Cl—COOR  IIIa wherein R is alkyl of 1 to 4 carbon atoms inclusive, or aralkyl of 7 to 10 carbon atoms inclusive, and the resulting compound of general Formula IVa:

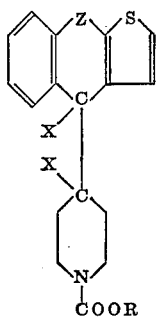

IVa wherein X, Z and R have the above significance, is subjected to hydrolysis, and, when an acid addition salt is required, the resulting compound of general Formula Ib is reacted with an acid.

One method of producing the compound of Formula Ib is as follows:

A compound of Formula IIa dissolved in an anhydrous inert organic solvent, preferably benzene, toluene, carbon tetrachloride or tetrahydrofuran, is added at room temperature to a solution of a chloroformic acid ester, e.g. chloroformic acid ethyl ester or chloroformic acid benzyl ester, in more of the same solvent. To complete the reaction the mixture is heated to the boil at reflux for a further 1 to 3 hours or the reaction mixture is allowed to stand at room temperature for 10 to 12 hours. The compound of Formula IVa obtained as intermediate is isolated and purified in manner known per se. The alkoxycarbonyl or aralkoxycarbonyl radical in said compound of Formula IVa is replaced hydrolytically by a hydrogen atom, for example by heating the compound IVa in an alkanol, preferably n-butanol, to the boil for 2 to 6 hours with an alkali hydroxide, e.g. potassium hydroxide. However, this hydrolysis may likewise be effected in an acid medium, e.g. with an aqueous 48% hydrogen bromide solution. The resulting compound of Formula Ib is isolated from the reaction mixture in manner known per se and is purified by crystallization or conversion into a suitable salt. Examples of acids for acid addition salt formation with compounds Ib are: hydrochloric, hydrobromic, phosphoric, sulphuric, acetic, malonic, fumaric, oxalic, maleic, tartaric, malic, hexahydrobenzoic, benzenesulphonic and p-toluenesulphonic acid.

The 4-(1-methyl-4-piperidyl) - 9,10 - dihydro - 4H-benzo[4,5]cyclohepta[1,2-b]thiophene used as starting material is new. It may be produced as follows: A solution of 4-(1-methyl-4-piperidylidene)- or 4-hydroxy-4-(1-methyl-4-piperidyl) - 9,10 - dihydro - 4H - benzo[4,5]cyclohepta[1,2-b]thiophene in glacial acetic acid is heated at reflux for 1½ hours with red phosphorus and hydriodic acid. After filtering the reaction mixture and concentrating the filtrate by evaporation, the residue is taken up in an organic solvent, preferably methylene chloride, in the presence of an alkali, e.g. a 20% sodium hydroxide solution. The iodine is removed from the organic phase with sodium thiosulphate and the desired final product is isolated in manner known per se and purified, preferably by converting into a suitable salt.

(c) Compounds of Formula Ic:

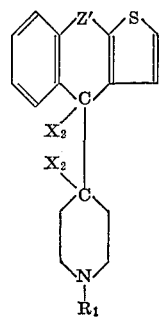

wherein

Z' is —CH$_2$—CH$_2$—,

R$_1$ has the above significance, and

X$_2$ is hydrogen, and their acid addition salts may be produced by reducing a compound of Formula IIb:

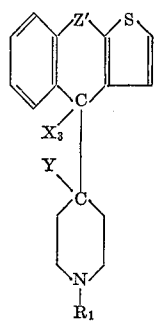

wherein
$R_1$ and $Z'$ have the above significance,
$X_3$ is hydroxy, and
Y is a hydrogen atom, or
$X_3$ and Y together are a second bond, with hydrogen iodide and red phosphorus while heating, the resulting reduction product is isolated in manner known per se and optionally converted into its acid addition salts by treating with an inorganic or organic acid.

Suitable starting materials of Formula IIb are 4-benzo[4,5]cyclohepta[1,2-b]thiophene derivatives or their 9,10-dihydro derivatives, having a 4-piperidylidene or 1-methyl-4-piperidylidene radical or a 4-piperidyl or 1-methyl-4-piperidyl radical and a hydroxyl radical in the 4-position.

One method of effecting the process of the invention consists in that a solution of a compound of Formula IIb in glacial acetic acid is heated at reflux for ½ to 3 hours with red phosphorus and hydriodic acid. After filtering the reaction mixture and concentrating the filtrate by evaporation, the residue is taken up in an organic solvent, e.g. methylene chloride, in the presence of an alkali, e.g. a 20% sodium hydroxide solution. The iodine is removed from the organic phase with sodium thiosulphate and the desired final product is then isolated in manner known per se and purified, preferably by conversion into a suitable salt. Examples of acids for acid addition salt formation are: hydrochloric, hydrobromic, phosphoric, sulphuric, acetic, malonic, fumaric, maleic, tartaric, oxalic, malic, hexahydrobenzoic, benzenesulphonic and p-toluenesulphonic acid.

The starting materials of Formula IIb, in which R signifies a hydrogen atom, are new. They may be produced by the following process:

4H-benzo[4,5]cyclohepta[1,2-b]thiophen-4-one or its 9,10-dihydro derivative is reacted with a Grignard compound of Formula V,

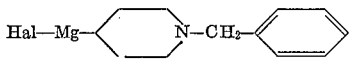

in which Hal is chlorine, bromine or iodine, the reaction product is hydrolyzed to the 4H-benzo[4,5]clclohepta-[1,2-b]thiophene derivative of Formula IIc:

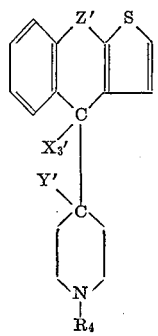

wherein
$Z'$ has the above significance,
$R_4$ is benzyl,
$X_3'$ is hydroxy, and
$Y'$ is hydrogen, and the benzyl radical is split off by catalytic hydrogenation. The elements of water may then be split off from the resulting compound, whereby starting materials of Formula IIb, in which $X_3$ and Y together signify a second bond, are obtained.

Starting materials of Formula IIb, in which $R_1$ is hydrogen and $X_3$ and Y together are a second bond, may also be obtained as follows: A compound of Formula IIb, in which $R_1$ is alkyl and $X_3$ and Y together are a second bond, dissolved in an inert organic anhydrous solvent, preferably benzene, toluene, carbon tetrachloride or tetrahydrofuran, is added at room temperature to a solution of a chloroformic acid ester, e.g. chloroformic acid ethyl ester, in more of the same solvent. The mixture is then heated to the boil at reflux for a further 1 to 3 hours or is allowed to stand at room temperature for several hours. The compound of the above Formula IVa, wherein the X's together form a second bond, and Z and R have the above significance, obtained as intermediate, is isolated and purified in manner known per se. The alkoxycarbonyl radical is then replaced hydrolytically by a hydrogen atom. The hydrolysis may also be effected in an alkaline or acid medium, e.g. with potassium hydroxide in a lower alkanol or with aqueous 48% hydrobromic acid.

The free bases of Formula I may be converted into their acid addition salts in manner known per se by reaction with an organic or inorganic acid. Examples of acids for salt formation are: hydrochloric, hydrobromic, phosphoric, sulphuric, acetic, malonic, fumaric, maleic, tartaric, malic, hexahydrobenzoic and p-toluenesulphonic acid.

4H-benzo[4,5]cyclohepta[1,2-b]thiophen-4-one, its derivatives substituted by halogen in the 6- or 7-position, and the correspondingly substituted 9,10-dihydro compounds of Formula II may be produced by the following process: o-phthalide or an o-phthalide substituted by a halogen atom in the 5- or 6-position is heated for several hours in an inert organic solvent, preferably carbon tetrachloride, with N-bromo-succinimide in the presence of a catlytical amount of dibenzoyl peroxide and the resulting 3-bromo-phthalide or the derivative substituted by halogen in the 5- and 6-position is heated with water, whereby o-phehalaldehydic acid or the corresponding phthalaldehydic acid halogenated in the 4- or 5-position results. This reaction product is then condensed in an anhydrous organic solvent therefor, with 2-thienyl-diethyl-phosphonate in the presence of an alkaline condensation agent, the resulting 2-[2-thienyl-(2)-vinyl]-benzoic acid or its halogen derivative is reduced to 2-[2-thienyl-(2)-ethyl]-benzoic acid or its halogen derivative and this is subjected to an interamolecular ring closure, whereby 9,10-dihydro-4H-benzo[4,5]cyclohepta[1,2-b]thiophen-4-one or its derivative substituted by halogen in the 6- or 7-position is obtained. Sodium amalgam in aqueous alcohol may, for example, be used as reducing agent and polyphosphoric acid may be used as condensation agent for the ring closure.

When it is desired to obtain compounds of Formula II which are not hydrogenated in the 9,10-position, the introduction of the double bond may, for example, be effected as follows: The 9,10-dihydro-4H-benzo[4,5]cyclohepto[1,2-b]thiophen-4-one or its derivative substituted by halogen in the 6- or 7-position obtained as above is heated with N-bromosuccinimide in absolute carbon tetrachloride and in the presence of a catalytical amount of dibenzoyl peroxide and the resulting reaction product is then heated with a trialkylamine. The resulting compound of Formula II is isolated in manner known per se and purified.

The compounds of Formula 1 exhibit histaminolytic, serotonin antagonistic, and anticholinergic effects in tests effected in vitro and in vivo. The sedative effect of the compounds I is weak, excepting for 6-chloro-4-(1-methyl-piperidylidene-(4)9,10-dihydro - 4H - benzo[4,5]cyclohepta[1,2-b]thiophene which has marked sedative and neuroleptic properties which are useful in the treatment of conditions of fear and excitation. A suitable dially dose in warm blooded animals is 0.01 to 0.2 mg./kg.

The compounds of Formula I are indicated for use as pharmaceuticals on their own or in the form of appropriate medicinal preparations for administration, e.g. enterally or parenterally. In order to produce suitable medicinal preparations the compounds are worked up with inorganic or organic adjuvants which are inert and physiologically acceptable. Examples of such adjuvants are as follows: for tablets and dragèes: lactose, starch, talc and stearic acid; for injectable solutions: water, alcohols, glycerin and vegetable oils; for suppositories: natural or hardened oils and waxes. The preparations may furthermore contain suitable preserving, stabilizing and wetting agents, solubilizers, sweetening and colouring substances and flavourings.

The term "in manner known per se" as used herein designates methods in use or described in the literature on the subject.

Example of a galenical preparation: Injectable solution

| | G. |
|---|---|
| 4 - (4 - piperidylidene) - 9,10 - dihydro - 4H - benzo-[4,5]cyclohepta[1,2-b]thiophene | 1.0 |
| 10% acetic acid | 6.0 |
| Sorbitol | 50.0 |
| Distilled water to make up 1000 ml. | |

Example of a galenical preparation: Injectable solution

| | G. |
|---|---|
| 4 - (1 - methyl - 4 - piperidyl) - 9,10 - dihydro - 4H-benzo[4,5]cyclohepta[1,2-b]thiophene | 1.0 |
| 10% acetic acid | 6.0 |
| Sorbitol | 50.0 |
| Distilled water to make up 1000 ml. | |

In the following non-limitative examples all temperatures are indicated in degrees Centigrade and are uncorrected.

EXAMPLE 1

(a) 6-chloro-4-[1-methyl-piperidyl-(4)]-9,10-dihydro-4H-benzo[4,5]cyclohepta[1,2-b]thiophen-4-ol 1.1 g. of magnesium which has been activated with iodine is covered with a layer of 10 cc. of absolute tetrahydrofuran and a few drops of ethylene bromide are added thereto. After the reaction has commenced a solution of 5.9 g. of 1-methyl-4-chloro-piperidine in 10 cc. of absolute tetrahydrofuran is added dropwise at such a rate that the solvent boils and the mixture is subsequently heated to the boil for a further hour. Subsequently a solution of 4.8 g. of 6-chloro-9,10-dihydro-4H-benzo[4,5]cyclohepta[1,2-b]thiophen-4-one in 10 cc. of absolute tetrahydrofuran is added dropwise at a temperature of 20° whilst cooling during the course of 15 minutes and the mixture is stirred at room temperature for a further 90 minutes. The reaction mixture is then poured into 300 cc. of an aqueous ammonium chloride solution, 150 cc. of methylene chloride are added thereto and all is filtered through highly purified diatomaceous earth. After separating the organic phase, the aqueous portion is shaken out a further two times with methylene chloride, the combined methylene chloride extracts are washed with water, dried over magnesium sulphate and evaporated at 15 mm. Hg. After recrystallization from ethanol the crystalline residue yields pure 6-chloro-4-[1-methylpiperidyl-(4)]-9,10 - dihydro - 4H - benzo[4,5]cyclohepta[1,2 - b]thiophen-4-ol having a melting point of 255–256°.

(b) 6-chloro-4-[1-methyl-piperidylidene-(4)]-9,10-dihydro-4H-benzo[4,5]cyclohepta[1,2-b]thiophene 4 g. of 6-chloro-4-[1-methyl-piperidyl-(4)]-9,10-dihydro - 4H - benzo[4,5]cyclohepta[1,2 - b]thiophen - 4 - ol are heated at reflux for one hour in a mixture of 70 cc. of glacial acetic acid and 28 cc. of concentrated hydrochloric acid. The reaction mixture is subsequently evaporated at 15 mm. Hg, the solid dry residue is dissolved in ethanol, the ethanolic solution is treated with animal charcoal, isopropanol is added thereto and the ethanol is evaporated. The precipitated hydrochloride is crystallized from absolute ethanol. Melting point 285–287° (decomposition).

The 6 - chloro - 9,10 - dihydro - 4H - benzo[4,5]cyclohepta[1,2-b]thiophen-4-one used as starting material is produced as follows:

5-chloro-phthalaldehydic acid: A mixture of 60 g. of 6-chloro-phthalide 61.5 g. of N-bromosuccinimide and 0.15 g. of benzoyl peroxide in 4000 cc. of anhydrous carbon tetrachloride is heated to the boil whilst stirring for 22 hours. The solution is filtered whilst hot and the filtrate is evaporated at 15 mm. Hg. The crude 3-bromo-6-chlorophthalide is subsequently heated to 100° for 8 hours together with 400 cc. of water and the solution is filtered through highly purified diatomaceous earth. After cooling, the precipitated acid is filtered off, the diatomaceous earth is heated to the boil once more with the mother liquor for several hours, the solution is filtered whilst hot and evaporated to a small extent at reduced pressure, whereby a further portion of acid is obtained. After drying in a vacuum at 90° the acid melts at 136–138°.

5-chloro-2-[2-thienyl-(2)-vinyl]-benzoic acid: 1 to 2 cc. of a solution of 70 g. of 5-chloro-phthalaldehydic acid and 89 g. of 2-thenyl-diethylphosphonate in 135 cc. of dimethylformamide are added dropwise to a suspension of 45.6 g. of sodium methylate in 135 cc. of dimethyl formamide, whereby the temperature of the mixture rises to 35–40°. The flask is then placed on an ice bath and the entire solution of 5-chloro-phthalaldehydic acid and 2-thenyl-diethylphosphonate is added dropwise as rapidly as possible at such a rate that the internal temperature remains at 35–40°. The reaction mixture is then stirred at room temperature for a further 30 minutes. 4300 cc. of water are slowly added to the reaction solution at 10–15° whilst cooling well and the aqueous solution is shaken out with 300 cc. of benzene. The aqueous solution is then carefully adjusted to a pH value of 3 to 4 with 2 N hydrochloric acid at 10–15°. After a few hours the precipitated acid is filtered off and dried. Melting point 152–153° from benzene.

5-chloro-2-[2-thienyl-(2)-ethyl]-benzoic acid: 18.8 g. of sodium are melted under anhydrous toluene, whereupon 1250 g. of pure mercury are added dropwise whilst stirring frequently at such a rate that the toluene boils. The mixture is then heated to 120–140° whilst stirring and cooled to 60° as soon as all the toluene is distilled off. A solution of 50 g. of 5-chloro-2-[2-thienyl-(2)-vinyl]-benzoic acid in 350 cc. of 95% ethanol is poured into the homogeneous amalgam and the mixture is vigorously shaken for 1½ to 2 hours. The mercury is then separated, washing is effected three times with ethanol and the combined ethanolic solutions are diluted with 5000 cc. of water. The solution is filtered through highly purified diatomaceous earth and the pH value is slowly adjusted to 1 with 2 N hydrochloric acid whilst stirring and cooling. After a few hours the precipitated acid is filtered off and recrystallized from ethanol. Melting point 134–135°.

6 - chloro - 9,10 - dihydro - 4H - benzo[4,5]cyclohepta[1,2-b]thiophen-4-one: 90 cc. of 84% phosphoric acid and 126 g. of phosphorus pentoxide are first stirred for 30 minutes at 125–130°. 30 g. of finely powdered 5-chloro- 2-[2-thienyl-(2)-ethyl]-benzoic acid are added at this temperature during the course of 30 minutes. The reaction mixture is stirred for a further hour at 125–130°, poured into 1500 cc. of ice water, the solution is filtered through highly purified diatomaceous earth and extracted three times with methylene chloride. The organic phase is washed first with 2 N sodium carbonate solution, then with water, dried over magnesium sulphate, the solvent is evaporated and the residue distilled in a high vacuum, whereby 6-chloro-9,10-dihydro-4H-benzo[4,5]cyclohepta[1,2-b]thiophen-4-one distils over at 185–195°/0.1 mm. Hg. in the form of an oil which crystallizes. Melting point 107–108° from ether.

EXAMPLE 2

(a) 7-chloro-4-[methyl-piperidyl-(4)]-9,10-dihydro-4H-benzo[4,5]cyclohepta[1,2-b]thiophen-4ol A solution of 4.97 g. of 7-chloro-9,10-dihydro-4H-benzo[4,5]cyclohepta[1,2-b]thiophen-4-one in 15 cc. of absolute tetrahydrofuran is added dropwise whilst stirring at room temperature to a Grignard compound produced from 6.14 g. of 1-methyl-4-chloro-piperidine and 1.1 g. of magnesium which has been activated with iodine in 20 cc. of absolute tetrahydrofuran. Stirring is subsequently effectetd for 20 minutes at 90°, the reaction mixture is then poured into a solution of 15 g. of ammonium chloride in 100 cc. of water and extraction is effected a number of times with chloroform. The extracts which have been dried over sodium sulphate are then evaporated to dryness and the residue is crystallized from methylene chloride/methanol. Melting point 228–230° (decomposition).

(b) 7-chloro-4-[1-methyl-piperidylidene-(4)]-9,10-dihydro-4H-benzo[4,5]cyclohepta[1,2-b]thiophene 4.6 g. of the 7-chloro-4-[1-methyl-piperidyl-(4)]-9,10-dihydro-4H-benzo[4,5]cyclohepta[1,2-b]thiophen-4-ol obtained according to a) are dissolved in a mixture of 46 cc. of glacial acetic acid and 18.5 cc. of concentrated hydrochloric acid and heated to the boil at reflux for one hour. The reaction mixture is then evaporated to dryness at 15 mm. Hg, the residue is taken up in 2 N sodium hydroxide solution and the solution is extracted a number of times with methylene chloride. The combined extracts are washed with water until neutral, dried over sodium sulphate, evaporated to dryness and the crystalline residue is crystallized from ethanol. Pure 7-chloro-4-[1-methyl-piperidylidene-(4)]-9,10-dihydro-4H-benzo[4,5]cyclohepta[1,2-b]thiophene melts at 148–150°.

The 7-chloro-9,10-dihydro-4H-benzo[4,5]cyclohepta[1,2-b]thiophen-4-one used as starting material is produced as follows:

3-bromo-5-chloro-phthalide: A mixture of 72.5 g. of 5-chloro-phthalide, 76.6 g. of N-bromosuccinimide and 0.25 g. of dibenzoyl-peroxide is heated to the boil in 4300 cc. of absolute carbon tetrachloride whilst stirring for 22 hours. After cooling the reaction mixture filtration is effected and the filtrate is evaporated to dryness at reduced pressure at 50°. After recrystallization from acetone pure 3-bromo-5-chloro-phthalide, having a melting point of 108–110°, is obtained from the crystalline residue.

4-chloro-phthalaldehydic acid: 59.1 g. of 3-bromo-5-chloro-phthalide are suspended in 600 cc. of water and the suspension is heated to 100° for 8 hours whilst stirring well. Cooling is effected to 0°, the 4-chloro-phthalaldehydic acid is filtered off and washed with ice cold water until neutral. Pure 4-chloro-phthaladehydic acid, having a melting point of 184–186°, is obtained without further purification.

4-chloro-2-[2-thienyl-(2)-vinyl]-benzoic acid: A solution of the mixture of 36.9 g. of 4-chloro-phthaladeyhdic acid and 47.0 g. of 2-thenyl-diethyl-phosphonate in 130 cc. of dimethylformamide is added dropwise whilst stirring well to a suspension of dry sodium methylate, produced from 10.4 g. of sodium in 110 cc. of dimethyl formamide. The dropwise addition is effected at such a rate that the internal temperature always remains at 35–45°. Subsequently stirring is effected at room temperature for a further 15 minutes and the mixture is poured onto 6000 cc. of water. The alkaline aqueous solution is carefully acidified to a pH value of 3 with dilute hydrochloric acid. The precipitated substance is filtered off and after recrystallizing the crude product from ethanol pure 4-chloro-2-[2-thienyl-(2)-vinyl]-benzoic acid, having a melting point of 198–200°, is obtained.

4-chloro-2-[2-thienyl-(2)-ethyl]-benzoic acid: A suspension of 18.5 g. of 4-chloro-2-[2-thienyl-(2)-vinyl]-benzoic acid in 350 cc. of 95% ethanol is added at once at 50° to sodium amalgam produced from 7.0 g. of sodium and 520 g. of mercury. Stirring is then effected at room temperature for 3 hours and the ethanolic solution of the reaction product is separated from the mercury. Evaporation to dryness is effected at 60° and reduced pressure and the residue is dissolved in 1000 cc. of water. The solution is filtered and the filtrate is acidified with concentrated hydrochloric acid. The reaction product is extracted with ether, the extracts are dried over sodium sulphate and the solvent is evaporated at 30° and reduced pressure. The crystalline residue is recrystallized from ethanol and yields pure 4-chloro-2-[2-thienyl-(2)-ethyl]-benzoic acid, having a melting point of 127–128°.

7-chloro-9,10-dihydro-4H-benzo[4,5]cyclohepta[1,2-b]thiophen-4-one: 104 g. of phosphorus pentoxide and 74 cc. of 80% phosphoric acid are mixed and the mixture is heated to 140° whilst stirring for 30 minutes. 25.7 g. of 4-chloro-2-[2-thienyl-(2)-ethyl]-benzoic acid are then added at the same temperature and stirring is effected at 140° for a further 3 hours. The hot reaction mixture is subsequently poured into 1400 cc. of water. Extraction is effected a number of times with ether, the combined extracts are dried over sodium sulphate and the solvent is evaporated at 30° and reduced pressure. the viscous residue is distilled in a hot air bath at a strongly reduced pressure. Boiling point 170–180°/0.1 mm. Hg. The distillate is made to crystallize in a mixture of ether and petroleum ether. Pure 7-chloro-9,10-dihydro-4H-benzo[4,5]cyclohepta[1,2-b]thiophen-4-one melts at 63–64°.

EXAMPLE 3

(a) 7-chloro-4-[1-methyl-piperidyl-(4)] - 4H-benzo[4,5]cyclohepta[1,2-b]thiophen-4-ol This compound is obtained from 10.5 g. of 1-methyl-4-chloro-piperidine, 1.9 g. of magnesium and 8.8 g. of 7-chloro-4H-benzo[4,5]cyclohepta[1,2-b]thiophen-4-one in 210 cc. of absolute tetrahydrofuran in a manner analogous to that described in Example 2(a). Melting point 153–155° from acetone.

(b) 7-chloro-4-[1-methyl-piperidylidene-(4)]-4H - benzo[4,5]cyclohepta[1,2-b]thiophene This compound is produced from 11.52 g. of the compound obtained in (a) above by heating in 115 cc. of glacial acetic acid and 46 cc. of concentrated hydrochloric acid. Melting point 160–162° from ethanol.

The 7-chloro-4H - benzo[4,5]cyclohepta[1,2 - b]thiophen-4-one used as starting material is produced as follows: A mixture of 24.8 g. of 7-chloro-9,10-dihydro-4H-benzo[4,5]cyclohepta[1,2 - b]thiophen-4-one (production described at the end of Example 2), 17.8 g. of N-bromosuccinimde and 50 mg. of dibenzoyl peroxide in 2500 cc. of absolute carbon tetrachloride is heated to 100° whilst stirring for 22 hours. The reaction mixture is left to cool, filtration is effected and the filtrate is evaporated at 50° and reduced pressure. The residue is dissolved in 250 cc. of triethyl amine and the solution is heated to the boil at reflux for 2 hours. The reaction mixture is then evaporated to dryness at reduced pressure and the residue taken up in 200 cc. of 2 N hydrochloric acid. Extraction is effected a number of times with methylene chloride, the combined extracts are washed with water until neutral, dried over sodium sulphate and evaporated to dryness. For purposes of purification the crude product is recrystallized twice from acetone and once from ethanol. Pure 7-chloro-4H-benzo[4,5]cyclohepta[1,2-b]thiophen-4-one melts at 141–142°.

EXAMPLE 4

(a) 4-[1-methyl-piperidyl-(4)]-4H-benzo[4,5]cyclohepta[1,2-b]thiophen-4-ol 1.98 g. of iodine activated magnesium are covered with 15 cc. of tetrahydrofuran and a number of drops of ethylene bromide are added thereto. After commencement of the reaction, a solution of 10.0 g. of 1-methyl-4-chloro-piperidine in 10 cc. of tetrahydrofuran are added dropwise at such a rate that the solvent boils, whereafter the mixture is heated to the boil for 1 hour. Subsequently a solution of 9.0 g. of 4H - benzo[4,5]cyclohepta[1,2 - b]thiophen-4-one in 20 cc. of abs. tetrahydrofuran are added dropwise while cooling to 15–20° within 20 minutes and the reaction mixture is stirred for half an hour at room temperature and then for a further 2 hours at reflux temperature. After cooling, the reaction mixture is poured into 600 cc. of a 20 percent aqueous solution of ammonium chloride, 250 cc. of methylene chloride are added thereto and the entire mixture filtered through highly purified diatomaceous earth. After separating off of the organic phase, the aqueous portion is shaken a further twice with methylene chloride, the combined methylene chloride solutions washed with water, dried over magnesium sulphate and evaporated at 15 mm. of Hg.

The solution of the residue in 300 cc. of methanol is then shaken at room temperature for 2 hours with animal charcoal, filtered and evaporated to 50 cc. After a few hours, the precipitated 4-[1-methyl-piperidyl-(4)]-4H-benzo[4,5]cyclohepta[1,2-b]thiophen-4-ol is filtered off and crystallized from methanol. M.P. 175.5–176.5°.

(b) 4-[1-methyl-piperidylidene-(4)]-4H-benzo-[4,5]cyclohepta[1,2-b]thiophene 8 g. of 4-[1-methyl-piperidyl-(4)]-4H-benzo[4,5]cyclohepta[1,2-b]thiophen-4-ol are heated to the boil for 18 hours in 400 cc. of acetic acid anhydride. After approximately 300 cc. of solvent have been evaporated off, the residue is poured into 2000 cc. of water while stirring, the aqueous solution filtered through highly purified diatomaceous earth, the mixture made strongly alkaline with a 20 percent sodium hydroxide solution, and the aqueous suspension extracted 3 times with ether. The combined ethereal extracts, which have been washed with water and dried over potassium carbonate, are then evaporated at a pressure of 15 mm. of Hg. The resulting residue is dissolved in hot isopropanol and the 4-[1-methyl-piperidylidene - (4)] - 4H - benzo[4,5]cyclohepta[1,2-b] thiophene eventually crystallizes therefrom. M.P. 124–125.5°.

Maleate: M.P. 211–212° (decomposition) from ethanol; produced by adding an ethanolic solution of 2.1 g. of maleic acid to an ethanolic solution of 5 g. of the pure base.

The 4H-benzo[4,5]cyclohepta[1,2-b]thiophen-4-one is produced as follows:

2-thenyl-diethyl-phosphonate: 133 g. of thenylchloride (B.P. 73–75°/15 mm. of Hg) are heated to 150°, whereupon 175 g. of freshly distilled triethylphosphite are slowly added dropwise thereto at this temperature while stirring, the mixture is heated for a further 2 hours to 160–170° while stirring. The reaction mixture is then distilled in a high vacuum; the thenyl-diethyl-phosphonate boils at 120–134°/0.06 mm. of Hg.

2[2-thienyl-(2)-vinyl-benzoic acid: 30 g. of pulverized, well dried sodium methylate are added to a solution of 117 g. of 2-thenyl-diethyl-phosphonate in 200 cc. of freshly distilled dimethyl formamide, whereupon the solution reaches a temperature of 45–50°. The flask is then placed into an ice bath and a solution of 80 g. of o-phthalaldehydic acid in 200 cc. of dimethyl formamide are added dropwise at such a rate that the temperature remains between 35–40°, whereupon the mixture is heated for a further 30–60 minutes at room temperature. 1600 cc. of water (temp. 10–15°) are then added to the reaction solution while cooling well, a red oil separating. The mixture is made alkaline with potassium carbonate, whereupon the oil again dissolves, the red-brown solution is shaken 3 times with benzene and the aqueous solution carefully brought to a pH value of 4 with hydrochloric acid at 10–15°. After a number of hours in the ice chest, the precipitated acid is filtered off, dried and crystallized from benzene. M.P. 133–135°.

The mother liquor is shaken thrice with methylene chloride, the organic phase dried over sodium sulphate and evaporated at 15 mm. of Hg. The residue is crystallized from benzene, a further portion of acid having a melting point of 133–135° resulting.

2-[2-thienyl-(2)-ethyl]-benzoic acid: 7.5 g. of sodium are melted under anhydrous toluene, whereafter 375 g. of pure mercury are added while shaking repeatedly and in such a manner that the toluene boils. The mixture is then heated while stirring to 120–140° and, as soon as all of the toluene has distilled off, the mixture is cooled to 50°. The homogenous amalgam is then covered with a solution of 20 g. of 2-[2-thienyl-(2)-vinyl]-benzoic acid in 150 cc. of 95 percent ethanol and the mixture shaken for 30 minutes. Thereafter the mercury is separated off, washed twice with ethanol and the combined ethanolic solutions are diluted with 1200 cc. of water. The solution is filtered through highly purified diatomaceous earth, acidified with hydrochloric acid and cooled to 5°. After a few hours, the precipitated acid is filtered off and crystallized from chloroform/hexane. M.P. 110–111°.

9,10 - dihydro - 4H - benzo[4,5]cyclohepta[1,2-b]thiophen-4-one: 59 cc. of an 84 percent phosphoric acid and 86 g. of phosphorous pentoxide are stirred for 30 minutes at 125–130°. 20 g. of pulverized 2-[2-thienyl-(2)-ethyl]-benzoic acid are then added at this temperature. The reaction mixture is stirred for a further 2 hours at 125–130°, poured into 1000 cc. of water, the solution filtered through highly purified diatomaceous earth and extracted thrice with methylene chloride. The organic phase is washed with a 2 N sodium carbonate solution, dried over magnesium sulphate, the solvent evaporated and the residue distilled in a high vacuum, the 9,10-dihydro-4H-benzo[4,5]cyclohepta[1,2-b]thiophen-4-one distilling off as a green oil at 125–140°/0.05 mm. of Hg. $n_D^{24}=1.6559$.

4H-benzo[4,5]cyclohepta[1,2-b]thiophen - 4 - one: For the purpose of introducing the double bond in the 9,10-position, a mixture of 32.1 g. of the resulting dihydro compound, 26.7 g. of N-bromo succinimide and 0.3 g. of benzoylperoxide in 250 cc. of absolute carbon tetrachloride, is heated to the boil for 4 hours. After cooling to 50°, the reaction mixture is filtered through highly purified diatomaceous earth and the solvent evaporated at 15 mm. of Hg. The resulting oily residue is then heated at reflux for 2 hours with 200 cc. of triethylamine. After evaporation of the unconverted triethylamine, 250 cc. of methylene chloride are added to the residue and the resulting solution is washed thrice with 2 N hydrochloric acid and twice with water. After drying the solution over magnesium sulphate, the solvent is removed at a reduced pressure. The residue is then distilled in a high vacuum, the 4H - benzo[4,5]cyclohepta[1,2-b]thiophen-4-one distilling off as a green oil at 173–180°/0.1 mm. of Hg and crystallizing upon cooling. M.P. 109–110° after recrystallization from ethanol.

EXAMPLE 5: 4-(4-PIPERIDYLIDENE) - 9,10 - DIHYDRO-4H-BENZO[4,5]CYCLOHEPTA[1,2 - b]THIOPHENE (a) 4-(1-ethoxycarbonyl-4-piperidylidene)-9,10 - dihydro-4H-benzo[4,5]cyclohepta[1,2-b]thiophene A solution of 11.5 g. of 4-(1-methyl-4-piperidylidene)-9,10-dihydro-4H-benzo[4,5]cyclohepta[1,2-b]thiophene in 50 ml. of absolute benzene is added dropwise during the course of one hour to a solution of 12.4 g. of chloroformic acid ethyl ester in 50 ml. of absolute benzene. The reaction solution is subsequently heated to the boil whilst stirring for a further 2 hours, is washed thrice with 1 N hydrochloric acid after cooling, is then washed twice more with water and dried over sodium sulphate. After evaporating the solvent, the residue is recrystallized from a hexane fraction having a boiling point of 67–69°. Pure 4-(1-ethoxycarbonyl-4-piperidylidene)-9,10-dihydro-4H - benzo[4,5]cyclohepta[1,2-b]thiophene has a melting point of 116–117°.

(b) 4-(4-piperidylidene)-9,10-dihydro-4H-benzo[4,5]cyclohepta[1,2-b]thiophene

A solution of 10.0 g. of 4-(1-ethoxycarbonyl-4-piperidylidene)-9,10-dihydro-4H-benzo[4,5]cyclohepta[1,2 - b]thiophene in 180 ml. of aqueous 48% hydrobromic acid is heated to the boil in an atmosphere of nitrogen for 30 minutes. The hot solution is poured into 1500 ml. of ice water and the resulting solution is made alkaline with sodium hydroxide solution. After shaking out several times with methylene chloride the combined organic extracts are washed with water and dried over soidum sulphate. The solvent is subsequently evaporated and the residue recrystallized from acetone. 4-(4-piperidylidene)-9,10-dihydro-4H-benzo[4,5]cyclohepta[1,2 - b]thiophene has a melting point of 130–131°.

Hydrochloride: The calculated amount of hydrochloric acid dissolved in ethanol is added to a solution of the base in ethanol, the precipitated hydrochloride is filtered off and recrystallized from ethanol/ethanol. Melting point 306–308° (decomposition).

EXAMPLE 6: 4-(4-PIPERIDYLIDENE)-4H-BENZO[4,5]CYCLOHEPTA[1,2-b]THIOPHENE (a) 4-(1-ethoxycarbonyl-4-piperidylidene)-4H-benzo[4,5]cyclohepta[1,2-b]thiophene This compound is produced from 17.0 g. of chloroformic acid ethyl ester and 15.0 g. of 4-(1-methyl-4-piperidylidene)-4H-benzo[4,5]cyclohepta[1,2 - b]thiophene in 250 ml. of absolute benzene, in a manner analogous to that described in Example 5(a). Melting point 137–138° (from a hexane fraction).

(b) 4-(4-piperidylidene)-4H-benzo[4,5]cyclohepta[1,2-b]thiophene

A solution of 7.0 g. of 4-(1-ethoxycarbonyl-4-piperidylidene)-4H-benzo[4,5]cyclohepta[1,2 - b]thiophene and 8.0 g. of potassium hydroxide in 100 cc. of methylisobutylcarbinol is heated to 140° in an atmosphere of nitrogen whilst stirring for 3 hours. After cooling, the resulting solution is washed five times with water, dried over magnesium sulphate and the solvent evaporated at reduced pressure. After recrystallizing from acetone the compound indicated in the heading has a melting point of 149–151°.

Hydrochloride: The calculated amount of hydrochloric acid dissolved in ethanol is added to a solution of the pure base in ethanol and the solution is cooled. The precipitated, analytically pure hydrochloride has a melting point of 309–310° (decomposition).

EXAMPLE 7: 4-(4-PIPERIDYL)-9,10-DIHYDRO - 4H-BENZO[4,5]CYCLOHEPTA[1,2-b]THIOPHENE

A solution of 11.5 g. of 4-(1-methyl-4-piperidyl)-9,10-dihydro-4H-benzo[4,5]cyclohepta[1,2-b]thiophene (melting point 127–129°, after crystallization from petroleum ether) in 50 ml. of absolute benzene is added dropwise during the course of one hour to a solution of 12.6 g. of chloformic acid ethyl ester in 50 ml. of absolute benzene. The reaction solution is subsequently heated to the boil whilst stirring for 2 hours, is washed thrice with 1 N hydrochloric acid after cooling, is then washed twice more with water and dried over sodium sulphate. After evaporating the solvent, the residue is dissolved in 180 ml. of aqueous 48% hydrobromic acid. Heating to the boil is effected for 30 minutes in an atmosphere of nitrogen, the hot solution is poured into 1500 ml. of ice water and the resulting solution is made alkaline with a sodium hydroxide solution. After shaking out several times with methylene chloride the combined organic extracts are washed with water and dried over sodium sulphate. The solvent is subsequently evaporated and the residue recrystallized from acetone. The resulting 4-(4-piperidyl)-9,10-dihydro-4H-benzo[4,5]cyclohepta[1,2-b]thiophene has a melting point of 122–125°.

Hydrogen oxalate: A solution of 0.45 g. of oxalic acid hydrate in 15 ml. of acetone is added to a solution of 0.9 g. of the base in 15 ml. of acetone. After concentrating the solution to 10 ml. and cooling with ice, the precipitated hydrogen oxalate is filtered off and recrystallized from acetone. Melting point 255–259° (decomposition).

The 4-(1-methyl-4-piperidyl)-9,10-dihydro-4H-benzo[4,5]cyclohepta[1,2-b]thiophene used as starting material is produced as follows:

A mixture of 2.0 g. of 4-(1-methyl-4-piperidylidene)-9,10-dihydro-4H-benzo[4,5]cyclohepta[1,2 - b]thiophene, 2.0 g. of red phosphorus and 10.6 ml. of 56% hydriodic acid in 60 ml. of glacial acetic acid is heated to the boil at reflux for 1½ hours, the mixture is filtered whilst hot and the filtrate concentrated by evaporation at reduced pressure. The residue is dissolved in a mixture of 50 ml. of 20% sodium hydroxide and 50 ml. of methylene chloride, the organic phase is separated and the aqueous portion shaken out twice more with methylene chloride. The combined methylene chloride solutions are washed twice with 5% sodium thiosulphate solution and twice with water, are dried over sodium sulphate and the solvent is evaporated. The resulting 4-(1-methyl-4-piperidyl)-9,10-dihydro-4H-benzo[4,5]cycdlohepta[1,2-b]thiophene has a melting point of 127–129° after recrystallization from petroleum ether.

EXAMPLE 8

4-(4-piperidyl)-9,10-dihydro-4H-benzo[4,5]cyclohepta[1,2-b]thiophene

A mixture of 3.0 g. of 4-(4-piperidylidene)-9,10-dihydro-4H-benzo[4,5]cyclohepta[1,2-b]thiophene, 3.0 g. of red phosphorus and 16 ml. of 56% hydriodic acid in 100 ml. of glacial acetic acid is heated to the boil at reflux for 1½ hours, is filtered whilst hot and the filtrate concentrated by evaporation at reduced pressure. The residue is dissolved in a mixture of 50 ml. of a 20% sodium hydroxide solution and 50 ml. of methylene chloride, the organic phase is separated and the aqueous portion shaken out twice more with methylene chloride. The combined methylene chloride solutions are washed twice with a 5% sodium thiosulphate solution and twice with water, are dried over sodium sulphate and the solvent evaporated. The resulting 4-(4-piperidyl)-9,10-dihydro-4H-benzo[4,5]cyclohepta[1,2-b]thiophene has a melting point of 122–125° after recrystallization from acetone.

Hydrogen oxalate: A solution of 0.45 g. of oxalic acid hydrate in 15 ml. of acetone is added to a solution of 0.9 g. of the base in 15 ml. of acetone. After concentrating the solution to 10 ml. and cooling with ice, the precipitated hydrogen oxalate is filtered off and recrystallized from acetone; melting point 255–259° (decomposition).

The 4-(4-piperidylidene)-9,10-dihydro-4H-benzo[4,5]cyclohepta[1,2-b] thiophene used as starting material is produced as follows:

(a) 4-(1-ethoxycarbonyl-4-piperidylidene)-9,10-dihydro-4H-benzo[4,5]cycloheptal[1,2-b]thiophene A solution of 11.5 g. of 4-(1-methyl-4-piperidylidene)-9,10-dihydro-4H - benzo[4,5]cyclohepta[1,2-b]thiophene in 50 ml. of absolute benzene is added dropwise during the course of one hour to a solution of 12.4 g. of chloroformic acid ethyl ester in 50 ml. of absolute benzene. The reatcion solution is subsequently heated to the boil whilst stirring for 2 hours, is washed thrice with 1 N hydrochloric acid after cooling, is washed twice more with water and dried over sodium sulphate. After evaporating the solvent, the residue is recrystallized from a hexane fraction having a boiling point of 67–69°. Pure 4-(1-ethoxycarbonyl - 4 - piperidylidene)-9,10-dihydro-4H-benzo[4,5]cyclohepta[1,2-b]thiophene has a melting point of 116–117°.

(b) 4-(4-piperidylidene)-9,10 - dihydro-4H-benzo[4,5]cyclohepta[1,2-b]thiophene

A solution of 10.0 g. of 4-(1-ethoxycarbonyl-4-piperidylidene) - 9,10 - dihydro - 4H - benzo[4,5]cyclohepta[1,2-b]thiophene in 180 ml. of 48% hydrobromic acid is heated to the boil in an atmosphere of nitrogen for 30 minutes. The hot solution is poured into 1500 ml. of ice water and the resulting solution is made alkaline with a sodium hydroxide solution. After shaking out several times with methylene chloride the combined organic extracts are washed with water and dried over sodium sulphate. The solvent is subsequently evaporated and the residue recrystallized from acetone. 4-(4-piperidylidene)-9,10-dihydro-4H - benzo[4,5]cyclohepta[1,2-b]thiophene has a melting point of 130–131°.

EXAMPLE 9

4-(1-methyl-4-piperidyl)-9,10-dihydro-4H-benzo[4,5]cyclohepta[1,2-b]thiophene (a) This compound is obtained from 2.0 g. of 4-(1-methyl-4-piperidylidene)-9,10 - dihydro - 4H-benzo[4,5]cyclohepta[1,2-b]thiophene, 2.0 g. of red phosphorus, 10.6 ml. of 56% hydriodic acid and 60 ml. of glacial acetic acid in a manner analogous to that described in Example 8. Melting point 127–129° (from petroleum ether).

Hydrogen oxalate: Crystallizes from 95% ethanol with one mol of water of crystallization; melting point 175–177° (decomposition).

(b) The compound indicated in the heading may also be obtained from 2.3 g. of 4-(1-methyl-4-piperidyl)-9,10-dihydro-4H - benzo[4,5]cyclohepta[1,2-b]thiophen-4-ol, 2.0 g. of red phosphorus, 10.6 ml. of 56% hydriodic acid and 60 ml. of glacial acetic acid, in a manner analogous to that described in Example 8.

What is claimed is:

1. A compound of the formula:

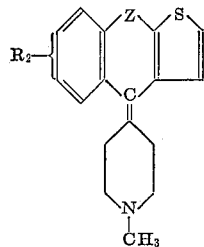

wherein:

Z is —CH$_2$—CH$_2$— or —CH=CH—;
R$_2$ is chloro or bromo when Z is —CH$_2$—CH$_2$— or R$_2$ is hydrogen, chloro or bromo when Z is —CH=CH—;

or a pharmaceutically acceptable acid addition salt thereof.

2. A compound of the formula:

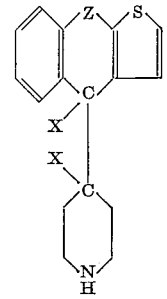

wherein:

Z is —CH$_2$—CH$_2$—; and
each X is hydrogen or together represents a second bond; or Z is —CH=CH— and the two X's are a second bond; or a pharmaceutically acceptable acid addition salt thereof.

3. A compound according to claim 1, in which the compound is 6-chloro-4-[1-methyl-piperidylidene-(4)]-9,10 - dihydro - 4H - benzo[4,5]cyclohepta[1,2-b]-thiophene.

4. A compound according to claim 1, in whch the compound is 7-chloro-4-[1-methyl-piperidylidene-(4)]-9,10-dihydro-4H-benzo[4,5]cyclohepta[1,2-b]thiophene.

5. A compound according to claim 1, in which the compound is 7 - chloro-4-[1-methyl-piperidylidene-(4)]-4H-benzo[4,5]cyclohepta[1,2-b]thiophene.

6. A compound according to claim 1, in which the compound is 4-[1-methyl-piperidylidene-(4)]-4H-benzo[4,5]cyclohepta[1,2-b]thiophene.

7. A compound according to claim 2, in which the compound is 4-(4-piperidylidene)-9,10-dihydro - 4H - benzo[4,5]cyclohepta[1,2-b]thiophene.

8. A compound according to claim 2, in which the compound is 4-(4-piperidylidene)-4H-benzo[4,5]cyclohepta[1,2-b]thiophene.

9. A compound according to claim 2, in which the compound is 4-(4-piperidyl)-9,10-dihydro - 4H - benzo[4,5]cyclohepta[1,2-b]thiophene.

References Cited

UNITED STATES PATENTS

| | | |
|---|---|---|
| 3,014,911 | 12/1961 | Engelhardt. |
| 3,126,411 | 4/1964 | Rey-Bellet et al. |
| 3,306,897 | 2/1967 | Renz et al. _____ 260—293.44 |
| 3,272,826 | 9/1966 | Jucker et al. _____ 260—293.44 |

FOREIGN PATENTS 416,623   1/1967   Switzerland.

OTHER REFERENCES

Burger: "Medicinal Chemistry," first edition, vol. 1, pp. 27–50 (Interscience) (1951).

Villiani et al.: "J. of Medicinal and Pharmaceutical Chemistry," vol. 5, pp. 373–383 (1962).

HENRY R. JILES, Primary Examiner

R. T. BOND, Assistant Examiner

U.S. Cl. X.R.

260—332.2, 332.3; 424—267